(12) United States Patent
Han et al.

(10) Patent No.: US 10,808,633 B2
(45) Date of Patent: Oct. 20, 2020

(54) HYBRID VEHICLE AND METHOD FOR CONTROLLING THE SAME

(71) Applicants: Hyundai Motor Company, Seoul (KR); Kia Motors Corporation, Seoul (KR)

(72) Inventors: Kyoungchan Han, Gyeonggi-do (KR); Seungeun Yu, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/447,337

(22) Filed: Jun. 20, 2019

(65) Prior Publication Data

US 2020/0109675 A1 Apr. 9, 2020

(30) Foreign Application Priority Data

Oct. 4, 2018 (KR) .......................... 10-2018-0118431

(51) Int. Cl.
*F02D 41/00* (2006.01)
*F02M 26/06* (2016.01)
(Continued)

(52) U.S. Cl.
CPC ........... *F02D 41/0007* (2013.01); *F01N 3/10* (2013.01); *F02B 37/04* (2013.01); *F02M 26/05* (2016.02);
(Continued)

(58) Field of Classification Search
CPC .... F02D 41/0007; F02M 26/05; F02M 26/06; F02M 26/73; F01N 3/10; F02B 37/04;
(Continued)

(56) References Cited

U.S. PATENT DOCUMENTS 9,726,090 B2 * 8/2017 Kim ........................ F02B 37/20
10,132,232 B2 * 11/2018 Kondo .................... F02B 37/04
(Continued)

FOREIGN PATENT DOCUMENTS

JP 6160412 B2 7/2017
JP 2017-213993 A 12/2017
KR 10-2017-0114488 A 10/2017

*Primary Examiner* — Shafiq Mian
(74) *Attorney, Agent, or Firm* — Mintz Levin Cohn Ferris Glovsky and Popeo, P.C.; Peter F. Corless

(57) ABSTRACT

A hybrid vehicle includes an engine with cylinders generating driving power and a turbocharger having a turbine in an exhaust line, and a compressor which rotates with the turbine and compresses intake gas. An electric supercharger is disposed in the intake line upstream from the compressor, a catalytic converter is disposed in the exhaust line downstream from the turbine. A post processing bypass line connects the exhaust line at a downstream portion of the catalytic converter and the intake line at a downstream portion of the electric supercharger. A low pressure EGR device includes a low pressure EGR line branching off from the exhaust line and merging into the intake line and a low pressure EGR cooler disposed therein. A high pressure EGR device includes a high pressure EGR line branching off from an exhaust system and merging into an intake system, and a high pressure EGR cooler disposed therein.

9 Claims, 5 Drawing Sheets

(51) Int. Cl.
    *F02B 37/04*        (2006.01)
    *F02M 26/05*       (2016.01)
    *F01N 3/10*         (2006.01)
    *F02M 26/73*       (2016.01)
    *B60K 6/24*        (2007.10)

(52) U.S. Cl.
    CPC ............ *F02M 26/06* (2016.02); *F02M 26/73* (2016.02); *B60K 6/24* (2013.01); *B60Y 2200/92* (2013.01); *B60Y 2400/435* (2013.01); *B60Y 2400/442* (2013.01)

(58) Field of Classification Search
    CPC  B60K 6/24; B60Y 2200/92; B60Y 2400/435; B60Y 2400/442
    See application file for complete search history.

(56) References Cited

U.S. PATENT DOCUMENTS

| | | | | |
|---|---|---|---|---|
| 10,145,320 | B1* | 12/2018 | Zeng | F02D 41/0052 |
| 2016/0326972 | A1* | 11/2016 | Kim | F02D 41/12 |
| 2017/0234209 | A1* | 8/2017 | Kondo | F02B 37/013 |
| | | | | 60/607 |
| 2017/0350329 | A1* | 12/2017 | Han | F02B 37/04 |
| 2018/0058289 | A1* | 3/2018 | Lee | F01N 3/2006 |
| 2018/0100428 | A1* | 4/2018 | Han | F01N 13/107 |
| 2020/0109675 | A1* | 4/2020 | Han | F02M 26/06 |

\* cited by examiner

HYBRID VEHICLE AND METHOD FOR CONTROLLING THE SAME

CROSS-REFERENCE TO RELATED APPLICATION

This application claims priority to and the benefit of Korean Patent Application No. 10-2018-0118431 filed on Oct. 4, 2018, the entire contents of which are incorporated herein by reference.

BACKGROUND

(a) Field of the Invention

The present invention relates to a hybrid vehicle and a method for controlling the same, and more particularly, to a hybrid vehicle and a method for controlling the same that can quickly increase a catalyst temperature of a catalytic converter.

(b) Description of the Related Art

Generally, a hybrid vehicle, in which a motor of an electric vehicle is applied to an existing internal combustion engine, or a combination of two or more driving sources such as a combination of an internal combustion engine and a fuel cell is applied, is recognized as a vehicle which is eco-friendly and has many improved factors in terms of fuel efficiency and performance compared to existing vehicles.

Recently, environmental regulations on noxious materials in exhaust gases from vehicles have been increasingly enhanced in many countries. Accordingly, vehicles are being developed with various types of catalyst devices for removing noxious materials such as NOx, CO, and THC contained in exhaust gases under those regulations on exhaust gases. As examples of the various types of catalyst devices, a diesel oxidation catalyst (DOC), a diesel particulate filter (DPF), a lean NOx trap (LNT), and a selective catalytic reduction unit (SCR) are used.

Even in the hybrid vehicle, a catalyst is used to reduce the exhaust gas of the engine, but since an activated temperature of the catalyst is significantly greater than room temperature, the catalyst temperature is increased by driving the engine and thus the catalyst is activated. An exhaust gas post-processing system, such as the DOC, the LNT, and the SCR, mounted for reducing noxious materials needs a basic temperature (activation temperature) for chemical reaction.

In an electric vehicle (EV) mode that the hybrid vehicle travels by only driving torque of a motor, exhaust gas is not exhausted. When the engine is repeatedly stopped by an idle stop & go (ISG) function, the amount of exhaust gas exhaust is minimal. Particularly, catalyst temperature of a catalytic converter is gradually decreased. Thereafter, when the engine is operated and amount of exhaust gas discharged from the engine is increased, the catalytic converter is not activated rapidly and thus a purification rate of exhaust gas by the catalytic converter and an amount of exhaust gas, such as nitrogen oxide, increases.

The above information disclosed in this section is merely for enhancement of understanding of the background of the invention and therefore it may contain information that does not form the prior art that is already known in this country to a person of ordinary skill in the art.

SUMMARY

The present invention has been made in an effort to provide a hybrid vehicle and a method using the same that may rapidly increase a catalyst temperature of an catalytic converter.

A hybrid vehicle according to an exemplary embodiment of the present invention may include an engine having a plurality of cylinders configured to generate driving power by burning fuel; a turbocharger having a turbine disposed in an exhaust line through which exhaust gas discharged from the cylinder flows and rotated by the exhaust gas, and a compressor which rotates in conjunction with the turbine and compresses intake gas to be supplied into the cylinder; an electric supercharger disposed in the intake line at an upstream portion of the compressor; an catalytic converter disposed in the exhaust line at a downstream portion of the turbine and having a catalyst; an intake bypass line which connects the intake line at a downstream portion of the electric supercharger and the intake line at an upstream portion of the electric supercharger; an intake bypass valve disposed in the intake bypass line; and a post processing bypass line which connects the exhaust line at a downstream portion of the catalytic converter and the intake line at a downstream portion of the electric supercharger.

The vehicle may further include a low pressure exhaust gas recirculation (EGR) device which includes a low pressure EGR line that branches off from the exhaust line at a downstream portion of the catalytic converter and merges into the intake line at an upstream portion of the compressor, a low pressure EGR cooler disposed in the low pressure EGR line, and a low pressure EGR valve disposed in a portion where the low pressure EGR line and the post processing bypass line are joined; and a high pressure EGR device having a high pressure EGR line that branches off from an exhaust system at an upstream portion of the turbine and merges into an intake system at a downstream portion of the compressor, a high pressure EGR valve disposed in the high pressure EGR line, and a high pressure EGR cooler disposed in the high pressure EGR line.

An electric catalyst heater may be disposed in the catalytic converter. The low pressure EGR valve may be formed as a three-way valve which selectively provides communication between the exhaust line and the low pressure EGR line, or the exhaust line and the post processing bypass line. The hybrid vehicle according to an exemplary embodiment of the present invention may further include a controller configured to execute an operation of the engine, the electric supercharger, the low pressure EGR valve, the intake bypass valve, the post processing bypass valve, the electric catalyst heater and the high pressure EGR valve base on an exhaust gas recirculation condition.

The exhaust gas circulation condition may be satisfied when the engine is stopped while the vehicle is being driven, a temperature of the catalytic converter is a predetermined temperature or less, and a stage of charge (SOC) of a battery is a predetermined value or greater. When the exhaust gas circulation condition is satisfied, the controller may be configured to operate the electric supercharger, close the intake bypass valve, open the high pressure EGR valve, operate the electric catalyst heater, and adjust the low pressure EGR valve to provide communication between the exhaust line and the post processing bypass line.

A method according to another exemplary embodiment of the present invention for controlling a hybrid vehicle including an engine having a plurality of a cylinder, an low pressure EGR device configured to recirculate some exhaust gas discharged from the engine, an electric supercharger configured to supply compressed air to the cylinder of the engine, a turbocharger operated by the exhaust gas discharged from the engine and compresses intake air supplied to the engine, a high pressure EGR device configured to recirculate some exhaust gas discharged from the engine, and a catalytic converter having a catalyst configured to purify the exhaust gas discharged from the engine, the method may include determining whether an exhaust gas circulation condition is satisfied; and operating the electric supercharger, a low pressure EGR valve of the low pressure EGR device, an intake bypass valve disposed in an intake bypass line bypassing the electric supercharger disposed in a intake line, a post processing bypass valve disposed in a post processing bypass line which connects an exhaust line at a downstream portion of the catalytic converter and an intake line between the electric supercharger and an intake manifold, an electric catalyst heater of the catalytic converter, and a high pressure EGR valve of the high pressure EGR device based on the exhaust gas recirculation condition.

The exhaust gas circulation condition may be satisfied when the engine is stopped while the vehicle is being driven, a temperature of the catalytic converter is a predetermined temperature or less, and a SOC of a battery is a predetermined value or greater. When the exhaust gas circulation condition is satisfied, the electric supercharger may be operated, the intake bypass valve may be closed, the high pressure EGR valve may be opened, the electric catalyst heater may be operated, and the exhaust line and the post processing bypass line may be fluidly communicated by the low pressure EGR valve.

According to an exemplary embodiment of the present invention, since heated air may be circulated through a circulation loop when the engine is temporarily stopped while the vehicle is being driven, a catalyst temperature may be maintained at about an activation temperature. Therefore, the catalyst temperature rapidly approaches to the activation temperature when the engine is restarted, and thus the purification efficiency of exhaust gas by the catalyst may be improved.

BRIEF DESCRIPTION OF THE DRAWINGS

The attached drawings illustrate exemplary embodiments of the present invention, provided for describing the present invention in more detail, but not for limiting technical aspects of the present invention.

DETAILED DESCRIPTION

Figure 1:
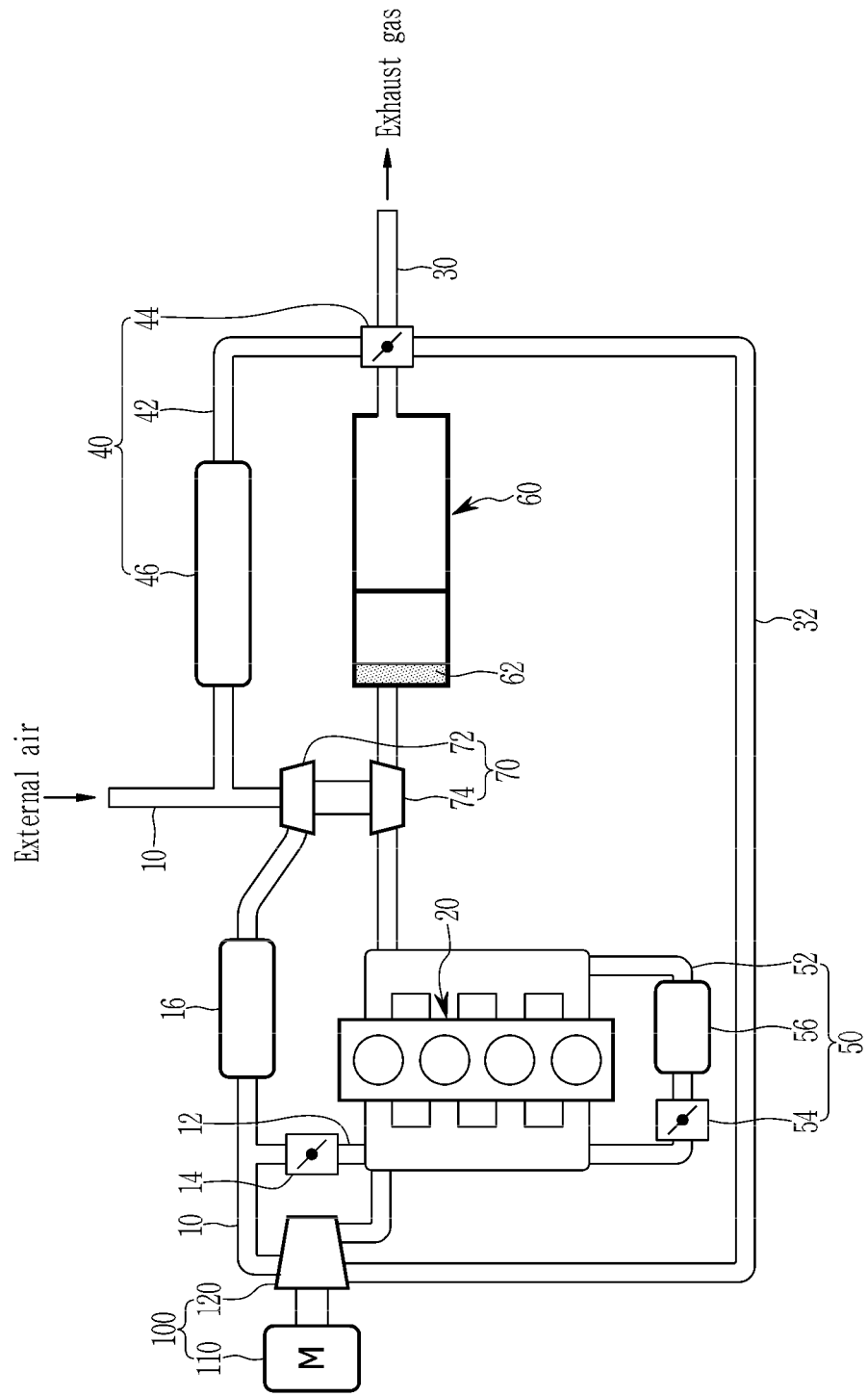
FIG. 1 is a schematic view illustrating a hybrid vehicle according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The present invention will be described more fully hereinafter with reference to the accompanying drawings, in which exemplary embodiments of the invention are shown. As those skilled in the art would realize, the described exemplary embodiments may be modified in various different ways, all without departing from the spirit or scope of the present invention. The drawings and description are to be regarded as illustrative in nature and not restrictive, Like reference numerals designate like elements throughout the specification. Further, since sizes and thicknesses of elements are shown at will for convenience of description, the present invention is not always limited to the drawings, and the thicknesses are enlarged for clearly expressing different parts and regions.

Hereinafter, a hybrid vehicle according to an exemplary embodiment of the present invention will be described in detail with reference to the accompanying drawings.

Figure 2:
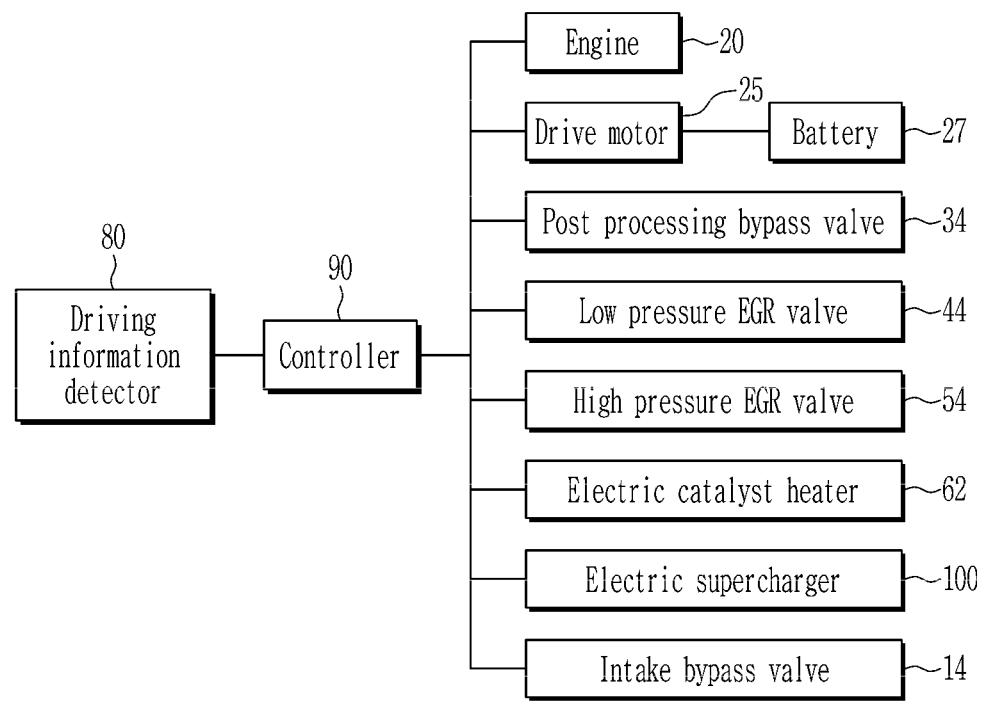
FIG. 2 is a block diagram illustrating a hybrid vehicle according to an exemplary embodiment of the present invention.

FIG. 1 is a schematic view illustrating a hybrid vehicle according to an exemplary embodiment of the present invention. And FIG. 2 is a block diagram illustrating a hybrid vehicle according to an exemplary embodiment of the present invention. As shown in FIG. 1 and FIG. 2, a hybrid vehicle according to an exemplary embodiment of the present invention may include an engine 20, a drive motor 25, a turbocharger 70, an electric supercharger 100, a catalytic converter 60, a low pressure EGR device 40 and a high pressure EGR device 50.

The engine 20 may include a plurality of cylinders 21 configured to generate driving torque by burning fuel. The engine 20 may further include an intake line 10 in which an intake gas supplied to the cylinder 21 flows and an exhaust line 30 in which an exhaust gas discharged from the cylinder 21 flows. The drive motor 25 may receive power from a battery 27 and support driving torque of the engine 20. The drive motor 25 may be configured to generate electric power by operating selectively as a power generator, and the electric power may be charged in the battery 27.

The catalytic converter 60 including a catalyst configured to purify various toxic material included in exhaust gas discharged from the cylinder 21 may be disposed in the exhaust line 30. The catalytic converter 60 may include a LNT (lean NOx trap), a diesel oxidation catalyst (DOC) and a diesel particulate filter (DPF). An electric catalyst heater 62 may be disposed in the catalytic converter 60. The electric catalyst heater 62 may be configured to heat the catalytic converter 60 as necessary. The electric supercharger 100 may be disposed in the intake line 10, configured to supply compressed air to the cylinder 21, and include a motor 110 and an electric compressor 120. The electric compressor 120 may be operated by the motor 110, and may be configured to compress external air depending on a driving condition to be supplied to the cylinder.

An intake bypass line 12 which bypasses the electric supercharger 100 may be disposed in the intake line 10. The intake bypass line 12 is branched off from the intake line 10 at an upstream portion of the electric supercharger 100 and merged into the intake line 10 at a downstream portion of the electric supercharger 100. An intake bypass valve 14 may be disposed in the intake bypass line 12, and air amount bypassing the electric supercharger 100 may be adjusted by opening degree of the intake bypass valve 14. The turbocharger 70 may be configured to compress intake gas (external air+recirculation exhaust gas) inflowing through the intake line 10 and supply the intake gas to the cylinder 21. The turbocharger 70 may include a turbine 72 disposed in the exhaust line 30 and configured to rotate by exhaust gas discharged from the cylinder 21 and a compressor 72 disposed in the intake line 10, configured to rotate in conjunction with the turbine 72 and compress the intake gas.

The hybrid vehicle according to an exemplary embodiment of the present invention may further include a post processing bypass line 32 which connects the intake line 10 and the exhaust line 30. The post processing bypass line 32 may connect the exhaust line at a downstream portion of the catalytic converter 60 and the intake line at a downstream portion of the electric supercharger 100. The low pressure EGR device 40 (LP-EGR) may include a low pressure EGR line 42, a low pressure EGR cooler 46 and a low pressure EGR valve 44. The low pressure EGR line 42 may be branched off from the exhaust line 30 at a downstream portion of the catalytic converter 60 and merged into the intake line at an upstream portion of the compressor. The low pressure EGR line 42 and the post processing bypass line 32 may be merged into the exhaust line 30. The low pressure EGR cooler 46 may be disposed in the low pressure EGR line 42 and may be configured to cool exhaust gas flowing through the low pressure EGR line 42.

The low pressure EGR valve 44 may be disposed at a portion where the low pressure EGR line 42 and the intake line 10 are joined with each other. The low pressure EGR valve 44 may be operated by a controller 90, and the exhaust line 30 and the low pressure EGR line 42 may selectively be in fluid communication with each other, or the exhaust line 30 and the post processing bypass line 32 may selectively be in fluid communication with each other by the operation of the low pressure EGR valve 44. Accordingly, the low pressure EGR valve 44 may be formed as a three-way valve (3-way valve). The configuration of the three-way valve is well known to a person skilled in the art, so detailed description will be omitted.

The high pressure EGR device 50 (HP-EGR: high pressure exhaust gas recirculation apparatus) may include a high pressure EGR line 52 branched off from an exhaust system (exhaust manifold and/or exhaust line) at an upstream portion of the turbine 74 and merged into an intake system (intake manifold and/or intake line), a high pressure EGR cooler 56 disposed in the high pressure EGR line 52, and a high pressure EGR valve 54 disposed in the high pressure EGR line 52 and configured to adjust exhaust gas amount that is recirculated to the intake line.

An intercooler 16 may be disposed in the intake line 10 at a downstream portion of the compressor 72. The intercooler 16 may be configured to cool intake gas, introduced through the intake line 10, through a heat exchange with a coolant. In other words, since the intake gas compressed by the turbocharger 70 expands as a temperature thereof increases, oxygen density of the intake gas supplied into the cylinder 21 decreases, and thus, it may be difficult to output torque required for the engine 20. Therefore, the density of the intake gas may be increased by cooling the intake gas by the intercooler 16, thereby improving combustion efficiency of the engine 20.

The hybrid vehicle according to an exemplary embodiment of the present invention may further include controller 90 configured to execute an operation of the engine 20, the electric supercharger 100, the low pressure EGR valve 44, the intake bypass valve 14, the post processing bypass valve 34, the electric catalyst heater 62 and the high pressure EGR valve 54 based on an exhaust gas circulation condition. The controller 90 may be configured to determine whether the exhaust gas circulation condition is satisfied based on a driving information detected by a driving information detector 80.

For example, the exhaust gas circulation condition may be satisfied when the engine 20 is stopped while the vehicle is being driven (in other word, intake air is not supplied to the cylinder 21), a temperature of the catalytic converter 60 is a predetermined temperature or less, and a stage of charge (SOC) of the battery 27 is a predetermined value or greater. In other words, the exhaust gas circulation condition may be satisfied when a drive mode of the vehicle is an electric vehicle (EV) mode in which the vehicle is driven by only driving torque of the drive motor 25, or the engine 20 is temporally stopped by an idle stop and go (ISG) function while being driven.

The driving information detector 80 may include a temperature sensor configured to detect the temperature of the catalytic converter 60, a SOC detector configured to detect SOC of the battery 27 and an intake air flow sensor configured to detect intake air amount supplied to the cylinder 21. The driving information detected by the driving information detector 80 may be transmitted to the controller 90. The controller 90 may be one or more processors activated by a predetermined program, and the predetermined program may be programmed to perform each step of a method for controlling the hybrid vehicle according an exemplary embodiment of this invention.

Figure 3:
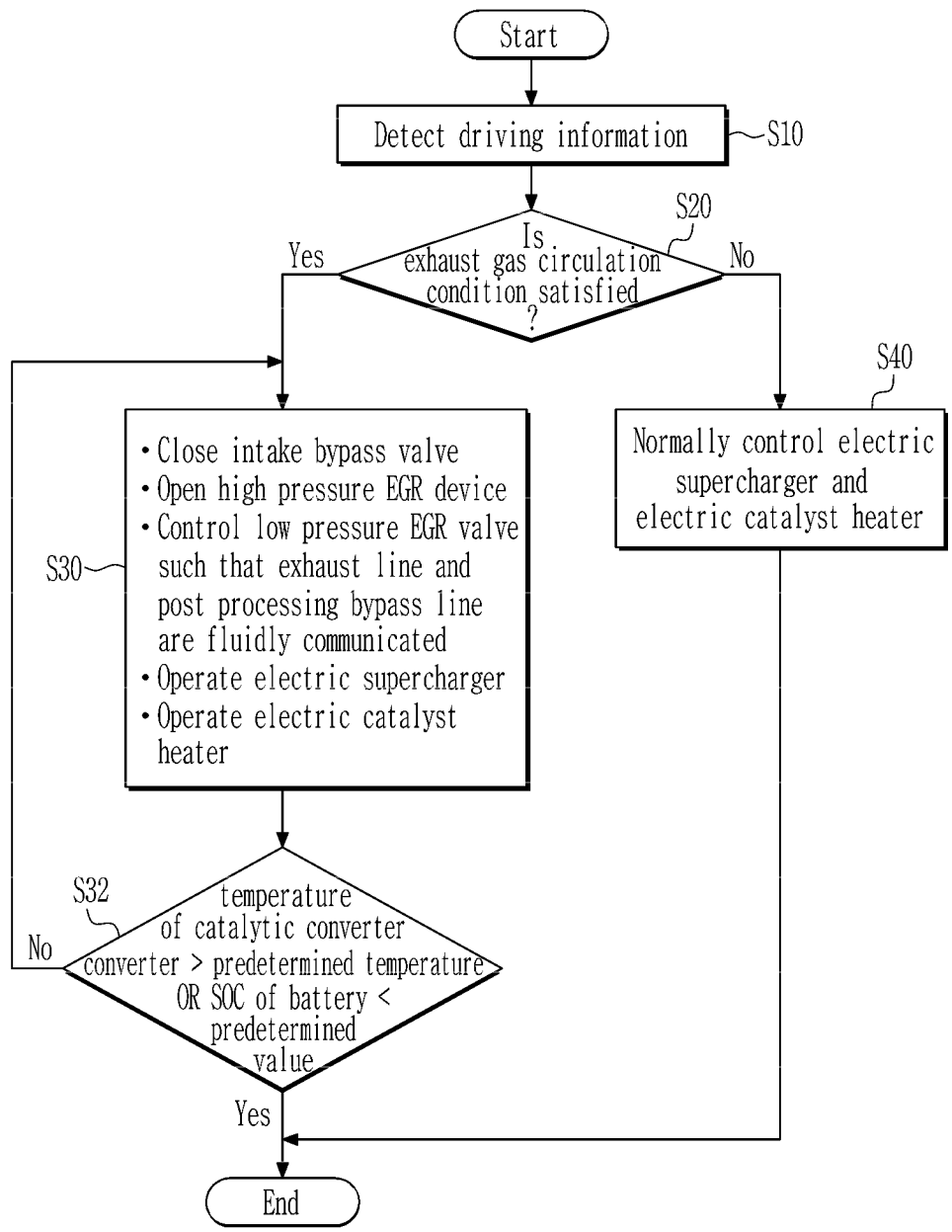
FIG. 3 is a flowchart illustrating a method for controlling a hybrid vehicle according to an exemplary embodiment of the present invention.

Hereinafter, a method for controlling the hybrid vehicle according to an exemplary embodiment of the present invention will be described in detail with reference to accompanying drawings. FIG. 3 is a flowchart illustrating a method for controlling a hybrid vehicle according to an exemplary embodiment of the present invention. Referring to FIG. 3, when the vehicle starts to travel, the driving information detector 80 may be configured to detect the driving information of the vehicle at step S10.

Figure 4:
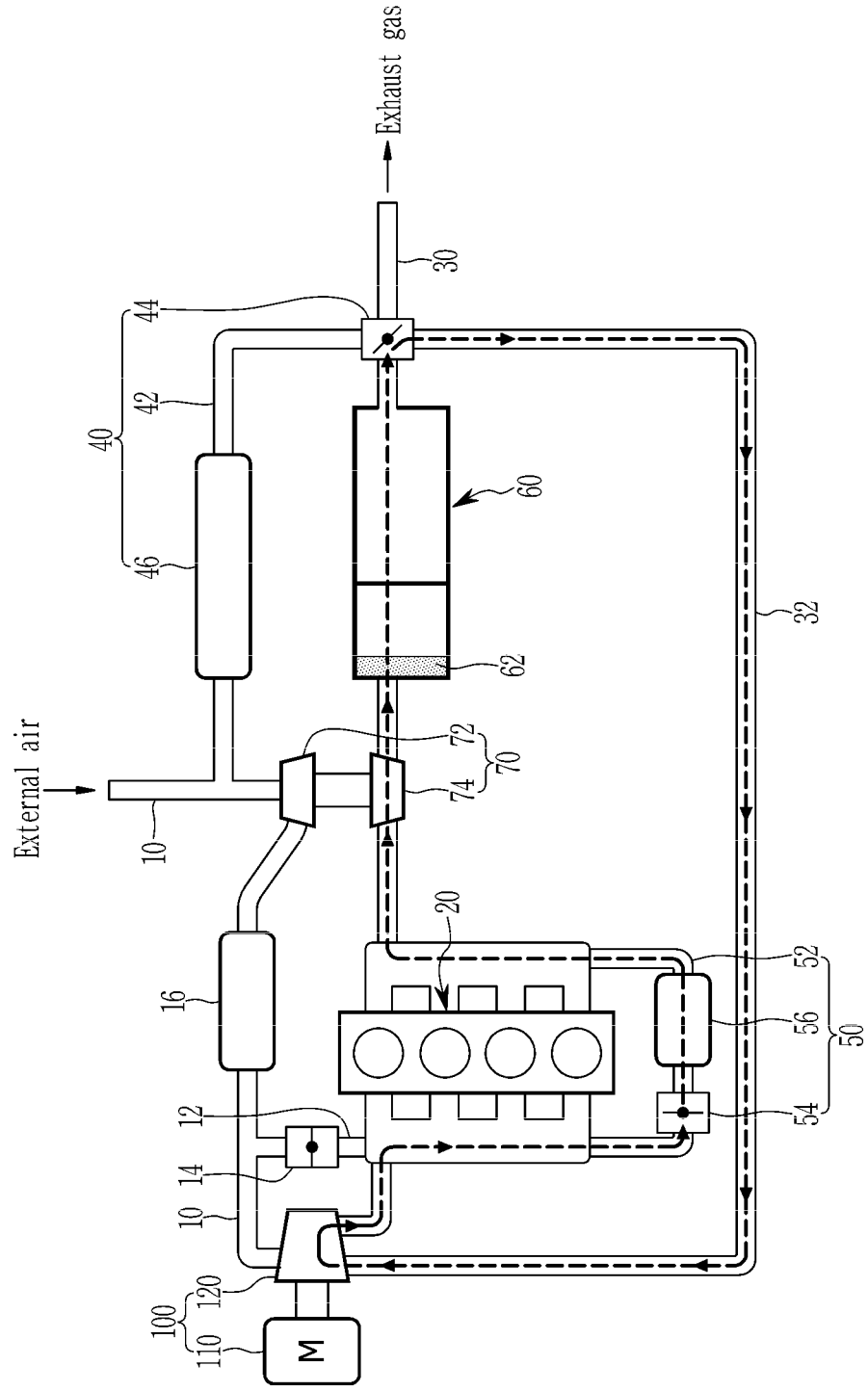
FIG. 4 is a drawing when an engine of a hybrid vehicle according to an exemplary embodiment of the present invention is stopped.

The controller 90 may be configured to determine whether the exhaust gas circulation condition is satisfied based on the driving information detected by the driving information detector 80 at step S20. The exhaust gas circulation condition is the same as the above-described, and hence no detailed description will be provided. When the exhaust gas recirculation condition is satisfied, the controller 90 may be configured to close the intake bypass valve 14, open the high pressure EGR valve 54, and adjust the low pressure EGR valve 44 such that the exhaust line 30 and the post processing bypass line 32 are in fluid communication at step S30. When the valves are adjusted as described above, the intake line 10, the high pressure EGR line 52, the exhaust line 30 and the post processing bypass line 32 may form a circulation loop which air circulates through (refer to FIG. 4).

Additionally, when the controller 90 operates the electric supercharger 100, air circulates through the circulation loop. At this time, the electric supercharger 100 may operate as a type of a pump. When the controller 90 operates the electric catalyst heater 62 of the catalytic converter 60, the air circulating the circulation loop may be heated and the catalyst temperature of the catalytic converter 60 may be increased. Accordingly, when the engine 20 is temporally stopped while the vehicle is being driven, the catalyst temperature may be maintained at about an activation temperature by heated air circulating through the circulation loop. When the engine 20 is restarted, the catalyst temperature is rapidly increased to the activation temperature, and a purification efficiency of exhaust gas by the catalytic converter 60 may be improved.

Figure 5:
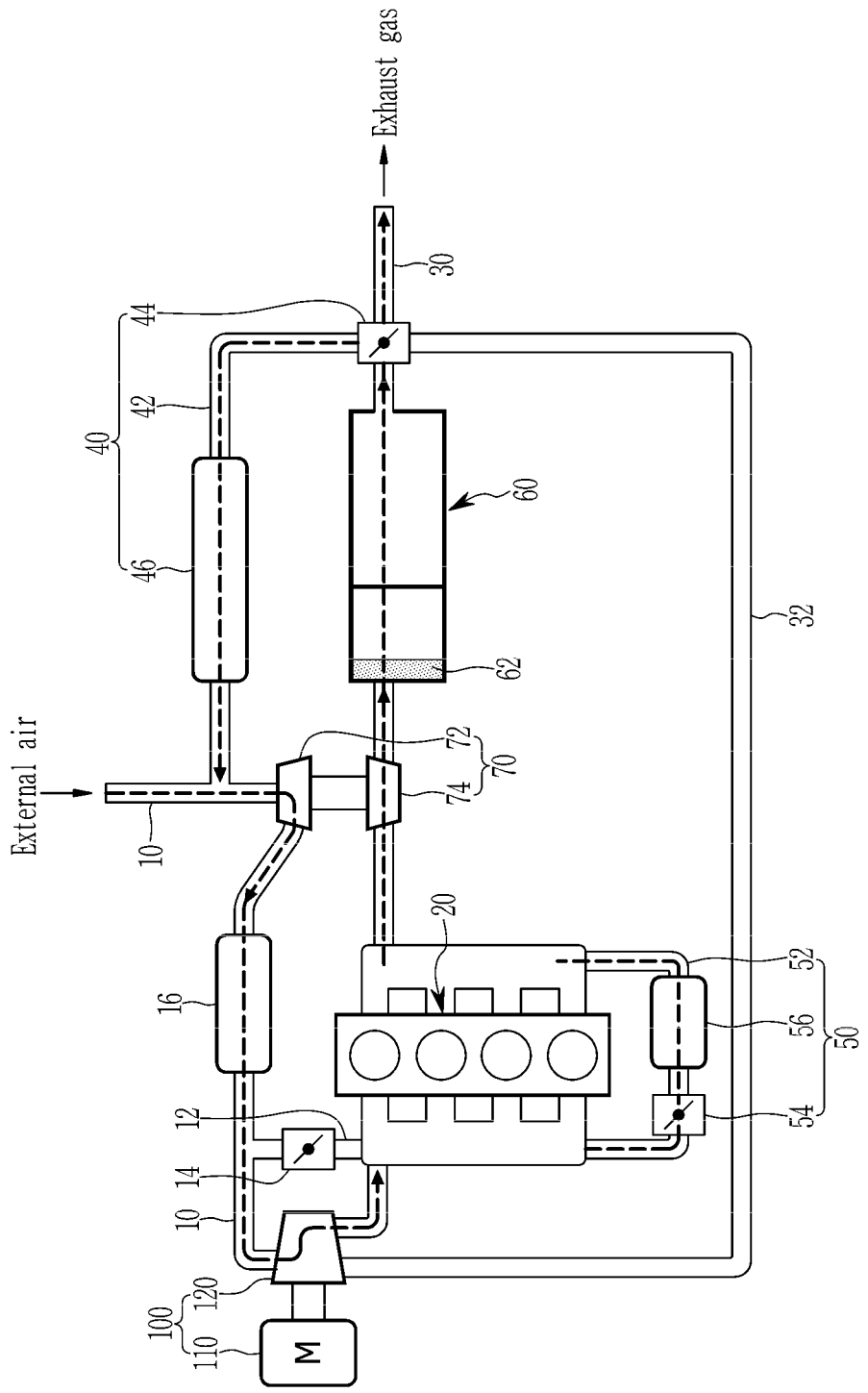
FIG. 5 a drawing when an engine of a hybrid vehicle according to an exemplary embodiment of the present invention is normally operated.

After the step S30, the controller 90 may be configured to continuously detect the temperature of the catalytic converter 60 and SOC of the battery 27 at step S32, and the controller may proceed to the step S30 when the temperature of the catalytic converter 60 is a predetermined temperature or greater, or the SOC of the is a predetermined value or less. In the step S20, when the exhaust gas circulation condition is not satisfied, the controller 90 may be configured to operate the electric supercharger 100, and adjust an opening degree of the intake bypass valve 14, the low pressure EGR valve 44 and the high pressure EGR valve 54 based on an operation region of the engine 20 at step S40. In other words, when the exhaust gas circulation condition is not satisfied, air is not circulated through the circulation loop, and the hybrid vehicle may be operated based on a general operation region of the engine 20 (refer to FIG. 5).

As described above, according to an exemplary embodiment of the present invention, heated air may be circulated through the circulation loop when the engine 20 is temporally stopped, exhaust gas is not discharged, and the catalyst temperature of the catalytic converter 60 is decreased. Accordingly, since the catalyst temperature may be maintained at about the activation temperature, the catalyst temperature rapidly reaches the activation temperature when the engine 20 is restarted, and thus the purification efficiency of exhaust gas by the catalyst may be improved.

While this invention has been described in connection with what is presently considered to be practical exemplary embodiments, it is to be understood that the invention is not limited to the disclosed exemplary embodiments, but, on the contrary, is intended to cover various modifications and equivalent arrangements included within the spirit and scope of the appended claims.

DESCRIPTION OF SYMBOLS

10: intake line
12: intake bypass line
14: intake bypass valve
16: intercooler
20: engine
21: cylinder
25: drive motor
27: battery
30: exhaust line
32: post processing bypass line
34: post processing bypass valve
40: low pressure EGR device
42: low pressure EGR line
44: low pressure EGR valve
46: low pressure EGR cooler
50: high pressure EGR device
52: high pressure EGR line
54: high pressure EGR valve
56: high pressure EGR cooler
60: catalytic converter
62: electric catalyst heater
70: turbocharger
72: turbine
74: compressor
80: driving information detector
90: controller
100: electric supercharger
110: motor
120: electric compressor While this invention has been described in connection with what is presently considered to be exemplary embodiments, it is to be understood that the invention is not limited to the disclosed exemplary embodiments. On the contrary, it is intended to cover various modifications and equivalent arrangements included within the spirit and scope of the appended claims.

What is claimed is:

1. A hybrid vehicle, comprising:
an engine including a plurality of cylinders configured to generate driving power by burning fuel;
a turbocharger including a turbine disposed in an exhaust line through which exhaust gas discharged from a cylinder flows and rotated by the exhaust gas, and a compressor which rotates in conjunction with the turbine and compresses intake gas to be supplied into the cylinder;

an electric supercharger disposed in an intake line at a downstream portion of the compressor;
a catalytic converter disposed in the exhaust line at a downstream portion of the turbine and having a catalyst;
an intake bypass line which connects the intake line at a downstream portion of the electric supercharger and the intake line at an upstream portion of the electric supercharger;
an intake bypass valve disposed in the intake bypass line;
a post processing bypass line which connects the exhaust line at a downstream portion of the catalytic converter and the intake line at a downstream portion of the electric supercharger;
a low pressure exhaust gas recirculation (EGR) device which includes a low pressure EGR line branching off from the exhaust line at a downstream portion of the catalytic converter and merging into the intake line at an upstream portion of the compressor, a low pressure EGR cooler disposed in the low pressure EGR line, and a low pressure EGR valve disposed in a portion where the low pressure EGR line and the post processing bypass line are joined; and
a high pressure EGR device which includes a high pressure EGR line branching off from an exhaust system at an upstream portion of the turbine and merging into an intake system at a downstream portion of the compressor, a high pressure EGR valve disposed in the high pressure EGR line, and a high pressure EGR cooler disposed in the high pressure EGR line.

2. The hybrid vehicle of claim 1, wherein an electric catalyst heater is disposed in the catalytic converter.

3. The hybrid vehicle of claim 1, wherein the low pressure EGR valve is formed as a three-way valve which selectively provides communication between the exhaust line and the low pressure EGR line, or between the exhaust line and the post processing bypass line.

4. The hybrid vehicle of claim 3, further comprising:
a controller configured to execute an operation of the engine, the electric supercharger, the low pressure EGR valve, the intake bypass valve, the post processing bypass valve, the electric catalyst heater and the high pressure EGR valve based on an exhaust gas recirculation condition.

5. The hybrid vehicle of claim 4, wherein the exhaust gas circulation condition is satisfied when the engine is stopped while the vehicle is being driven, a temperature of the catalytic converter is a predetermined temperature or less, and a stage of charge (SOC) of a battery is a predetermined value or greater.

6. The hybrid vehicle of claim 5, wherein when the exhaust gas circulation condition is satisfied, the controller is configured to operate the electric supercharger, close the intake bypass valve, open the high pressure EGR valve, operate the electric catalyst heater, and adjust the low pressure EGR valve to provide communication between the exhaust line and the post processing bypass line.

7. A method for controlling a hybrid vehicle including an engine having a plurality of cylinders, a low pressure exhaust gas recirculation (EGR) device which recirculates exhaust gas discharged from the engine, an electric supercharger for supplying compressed air to a cylinder of the engine, a turbocharger which is operated by the exhaust gas discharged from the engine and compresses intake air supplied to the engine, a high pressure EGR device which recirculates some exhaust gas discharged from the engine, and a catalytic converter which includes a catalyst for purifying the exhaust gas discharged from the engine,
wherein the electric supercharger is disposed downstream of a compressor; the method comprising:
determining, by a controller, whether an exhaust gas circulation condition is satisfied; and
operating, by the controller, the electric supercharger, a low pressure EGR valve of the low pressure EGR device, an intake bypass valve disposed in an intake bypass line bypassing the electric supercharger disposed in a intake line, a post processing bypass valve disposed in a post processing bypass line which connects an exhaust line at a downstream portion of the catalytic converter and an intake line between the electric supercharger and an intake manifold, an electric catalyst heater of the catalytic converter, and a high pressure EGR valve of the high pressure EGR device based on the exhaust gas recirculation condition.

8. The method of claim 7, wherein the exhaust gas circulation condition is satisfied when the engine is stopped while the vehicle is being driven, a temperature of the catalytic converter is a predetermined temperature or less, and a stage of charge (SOC) of a battery is a predetermined value or greater.

9. The method of claim 8, wherein when the exhaust gas circulation condition is satisfied, the electric supercharger is operated, the intake bypass valve is closed, the high pressure EGR valve is opened, the electric catalyst heater is operated, and the exhaust line and the post processing bypass line are in fluid communication by operation of the low pressure EGR valve.

* * * * *